United States Patent
Kunze et al.

(10) Patent No.: US 11,124,118 B2
(45) Date of Patent: *Sep. 21, 2021

(54) VEHICULAR DISPLAY SYSTEM WITH USER INPUT DISPLAY

(71) Applicant: MAGNA ELECTRONICS INC., Auburn Hills, MI (US)

(72) Inventors: Norbert Kunze, Diez (DE); Ruediger Boegel, Großostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/819,734

(22) Filed: Mar. 16, 2020

(65) Prior Publication Data

US 2020/0215975 A1    Jul. 9, 2020

Related U.S. Application Data

(63) Continuation of application No. 15/610,766, filed on Jun. 1, 2017, now Pat. No. 10,589,676.

(Continued)

(51) Int. Cl.
*H04N 7/18* (2006.01)
*B60R 1/00* (2006.01)
(Continued)

(52) U.S. Cl.
CPC ............. *B60R 1/00* (2013.01); *B60K 35/00* (2013.01); *B60K 37/02* (2013.01); *B60K 37/06* (2013.01); *G02B 27/01* (2013.01); *G02B 27/0101* (2013.01); *G06F 3/0488* (2013.01);
*G06K 9/00832* (2013.01); *H04N 7/183* (2013.01); *B60K 2370/1438* (2019.05); *B60K 2370/152* (2019.05); *B60K 2370/155* (2019.05); *B60K 2370/1529* (2019.05); *B60K 2370/184* (2019.05); *B60K 2370/21* (2019.05); *B60K 2370/29* (2019.05); *B60K 2370/31* (2019.05); *B60K 2370/334* (2019.05);
(Continued)

(58) Field of Classification Search
None
See application file for complete search history.

(56) References Cited

U.S. PATENT DOCUMENTS 5,530,240 A    6/1996  Larson et al.
5,550,677 A    8/1996  Schofield et al.
(Continued)

*Primary Examiner* — Richard T Torrente
(74) *Attorney, Agent, or Firm* — Honigman LLP

(57) ABSTRACT

A vehicular display system includes a camera that is disposed in a vehicle and that views a hand of a driver of the vehicle. A heads up display system establishes a heads up display viewable by the driver and derived at least in part from image data captured by the camera. The heads up display includes (i) information representative of user actuatable inputs for controlling at least one accessory of the vehicle and (ii) images representative of at least a part of the driver's hand. The images representative of at least a part of the driver's hand are derived at least in part from image data captured by the camera. The images representative of at least a part of the driver's hand are partially transparent so the information representative of the user actuatable inputs are viewable through the images representative of at least a part of the driver's hand.

10 Claims, 7 Drawing Sheets

Related U.S. Application Data

(60) Provisional application No. 62/355,459, filed on Jun. 28, 2016, provisional application No. 62/344,528, filed on Jun. 2, 2016.

(51) Int. Cl.

| | | |
|---|---|---|
| *G06K 9/00* | (2006.01) | |
| *G02B 27/01* | (2006.01) | |
| *B60K 37/06* | (2006.01) | |
| *B60K 37/02* | (2006.01) | |
| *G06F 3/0488* | (2013.01) | |
| *B60K 35/00* | (2006.01) | |
| *B60R 1/12* | (2006.01) | |
| *G06F 3/0481* | (2013.01) | |
| *G06F 3/042* | (2006.01) | |

(52) U.S. Cl.
CPC . *B60R 2001/1253* (2013.01); *B60R 2300/105* (2013.01); *B60R 2300/205* (2013.01); *B60R 2300/207* (2013.01); *B60R 2300/308* (2013.01); *B60R 2300/8006* (2013.01); *G02B 2027/014* (2013.01); *G02B 2027/0138* (2013.01); *G02B 2027/0141* (2013.01); *G06F 3/0425* (2013.01); *G06F 3/04812* (2013.01)

(56) References Cited

U.S. PATENT DOCUMENTS

| | | |
|---|---|---|
| 5,670,935 A | 9/1997 | Schofield et al. |
| 5,949,331 A | 9/1999 | Schofield et al. |
| 6,329,925 B1 | 12/2001 | Skiver et al. |
| 6,690,268 B2 | 2/2004 | Schofield et al. |
| 6,788,809 B1 | 9/2004 | Grzeszczuk et al. |
| 7,004,593 B2 | 2/2006 | Weller et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 8,427,751 B2 | 4/2013 | Rumpf et al. |
| 8,953,247 B2 | 2/2015 | Rumpf et al. |
| 9,405,120 B2 | 8/2016 | Graf et al. |
| 9,620,042 B2 | 4/2017 | Lauber et al. |
| 9,701,258 B2 | 7/2017 | Tiryaki |
| 10,589,676 B2 | 3/2020 | Kunze et al. |
| 2002/0126876 A1 | 9/2002 | Paul et al. |
| 2006/0050018 A1 | 3/2006 | Hutzel et al. |
| 2006/0061008 A1 | 3/2006 | Karner et al. |
| 2011/0242025 A1 | 10/2011 | Wen et al. |
| 2012/0162427 A1 | 6/2012 | Lynam |
| 2012/0249791 A1 | 10/2012 | Shen et al. |
| 2012/0327232 A1 | 12/2012 | Yang et al. |
| 2013/0155237 A1 | 6/2013 | Paek et al. |
| 2013/0250108 A1 | 9/2013 | Du et al. |
| 2014/0160248 A1 | 6/2014 | Pomerantz et al. |
| 2014/0184494 A1 | 7/2014 | Burachas |
| 2014/0336876 A1 | 11/2014 | Gieseke et al. |
| 2014/0336878 A1 | 11/2014 | Yanai et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0232030 A1 | 8/2015 | Bongwald |
| 2015/0277735 A1 | 10/2015 | Gibson |
| 2015/0294169 A1 | 10/2015 | Zhou et al. |
| 2015/0296135 A1 | 10/2015 | Wacquant et al. |
| 2015/0344028 A1 | 12/2015 | Gieseke et al. |
| 2015/0352953 A1* | 12/2015 | Koravadi ........... B60H 1/00985 701/36 |
| 2016/0137126 A1 | 5/2016 | Fursich et al. |
| 2016/0320900 A1* | 11/2016 | Nabe ................... G06F 3/1454 |
| 2017/0153457 A1 | 6/2017 | Kunze |
| 2017/0235137 A1 | 8/2017 | Kunze |
| 2017/0359547 A1 | 12/2017 | Rumpf et al. |
| 2018/0210210 A1* | 7/2018 | Yamamura ............. B60R 1/001 |
| 2018/0215378 A1 | 8/2018 | Edo Ros |

\* cited by examiner

VEHICULAR DISPLAY SYSTEM WITH USER INPUT DISPLAY

CROSS REFERENCE TO RELATED APPLICATIONS

The present application is a continuation of U.S. patent application Ser. No. 15/610,766, filed Jun. 1, 2017, now U.S. Pat. No. 10,589,676, which claims the filing benefits of U.S. provisional applications, Ser. No. 62/355,459, filed Jun. 28, 2016, and Ser. No. 62/344,528, filed Jun. 2, 2016, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Head up displays (HUD) are also known and display images at a windshield area of the vehicle. Examples of known HUD systems are described in U.S. Pat. Nos. 8,953,247 and/or 8,427,751, which are hereby incorporated herein by reference in their entireties.

SUMMARY OF THE INVENTION

The present invention provides a vision system or imaging system or display system for a vehicle that utilizes one or more cameras (preferably one or more CMOS cameras) to capture image data representative of images interior the vehicle, and provides display (for viewing by the driver) of the driver's hand (or portions thereof or iconistic representations thereof) as the driver's hand approaches and contacts a user input to control or adjust an accessory of the vehicle. The display may comprise a head up display or HUD (that may project displayed images at the windshield area forward of the driver so the driver can readily view the displayed images without taking his or her eyes off the road). The system of the present invention thus provides display of the driver's hand to assist the driver in controlling or adjusting a user input of an accessory so that the driver can achieve the desired control or adjustment without having to look downward toward the user input at the instrument panel or dashboard or console of the vehicle.

These and other objects, advantages, purposes and features of the present invention will become apparent upon review of the following specification in conjunction with the drawings.

LEGEND

Figure 1:
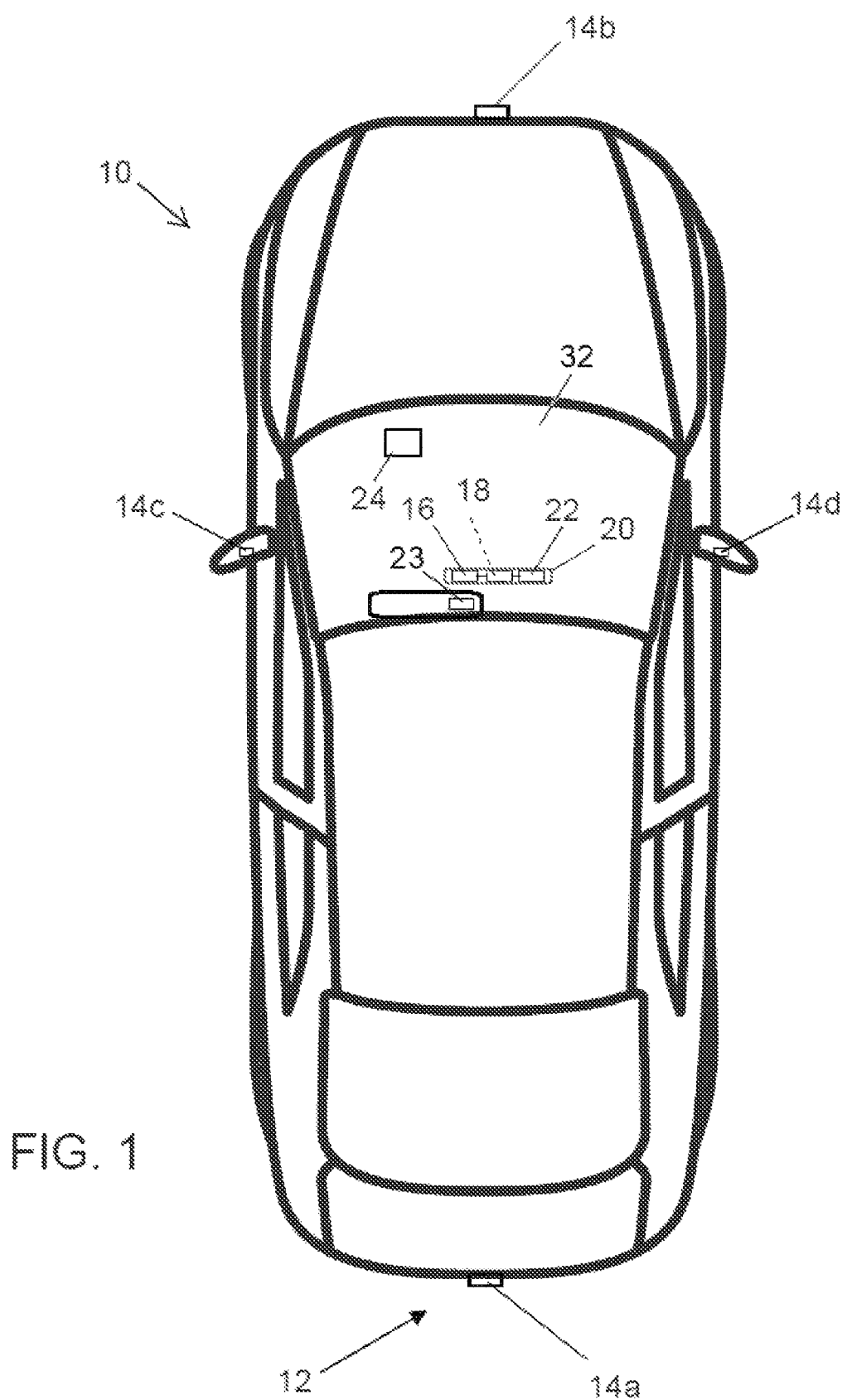
FIG. 1 is a plan view of a vehicle with a vision system that incorporates cameras in accordance with the present invention.

10 vehicle
12 vision system
14a, 14b, 14c, 14d cameras
18 processor
16 display
20 rearview mirror assembly
22 camera in mirror or elsewhere
23 camera disposed near the central instrument cluster
24 head up display device
25 head up display image on windshield
26 instrument cluster
27 central cluster
28 knobs
29 touch screen
30 driver compartment
31 left side window
32 windshield
33 touch screen display content
34 driver

DESCRIPTION OF THE PREFERRED EMBODIMENTS

A vehicle vision system and/or driver assist system and/or object detection system operates to capture images interior and/or exterior of the vehicle and may process the captured image data to display images and/or to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). The cameras may be arranged so as to point substantially or generally horizontally away from the vehicle. The lens system's vertically opening angles α may be, for example, around 180 degrees, and the horizontally opening angles β may be, for example, around 180 degrees. The vision system 12 includes a control or electronic control unit (ECU) or processor 18 that is operable to process image data captured by the cameras and may provide displayed images at a display device 16 for viewing by the driver 33 of the vehicle (although shown in FIG. 1 as being part of or incorporated in or at an interior rearview mirror assembly 20 of the vehicle, the control and/or the display device may be disposed elsewhere at or in the vehicle).

In the illustrated embodiment of FIGS. 1-3 and 7, the vision system includes an interior monitoring camera 22 having an interior field of view to capture images or image data of and track or monitor the position of the driver's hands and/or head and/or the direction that the driver's eyes are looking. The camera 22 may be disposed at or in the mirror head of the mirror assembly (and may be adjusted with adjustment of the mirror head) or may be disposed elsewhere within the interior cabin of the vehicle, with its field of view encompassing an area that is typically occupied by a driver of the vehicle when the driver of the vehicle is occupying the driver's seat of the vehicle and normally operating the vehicle. The camera 22 or optionally another camera 23 may also be disposed near the instrument cluster 26, or the central cluster 27, having the input interfaces, such as the buttons, knobs 28 or touch screen 29 or touch screens, in the field of view for capturing the occupants, especially the driver's hand. In the illustrated embodiment, camera 23 is integrated into the instrument cluster and camera 22 is attached at the interior rearview mirror. Responsive to image processing of image data captured by the interior monitoring camera, the system may determine the user's hand or finger's pose and/or the finger's position and optionally, but not necessarily, also the gestures (by that a sequence or hand or finger poses) made by the driver (or other occupant), and may control one or more of the cameras according to the determined position or gesture or movement.

In gesture recognition systems, learning and calibration modes for user specific gesture profile generation/improvement are specified. The user specific gesture profile generation/improvement requires active efforts of driver input, either by passing a calibration procedure or by giving redundant input by voice to confirm or disconfirm user gesture inputs recognitions or to strengthen the its confidence level.

Typically, such gesture recognition or driver monitoring systems employ one or two cameras, such as one or two infrared (IR) or near IR cameras and an IR or near IR illumination source. Some of such systems use time of flight (TOF) cameras for capturing 3D images or sequences. An associated control and image processor or image processing system may process captured image data and, responsive to such image processing, discriminate a driver's (or user's) hand (and eventually arm and fingers) position.

Figure 7:
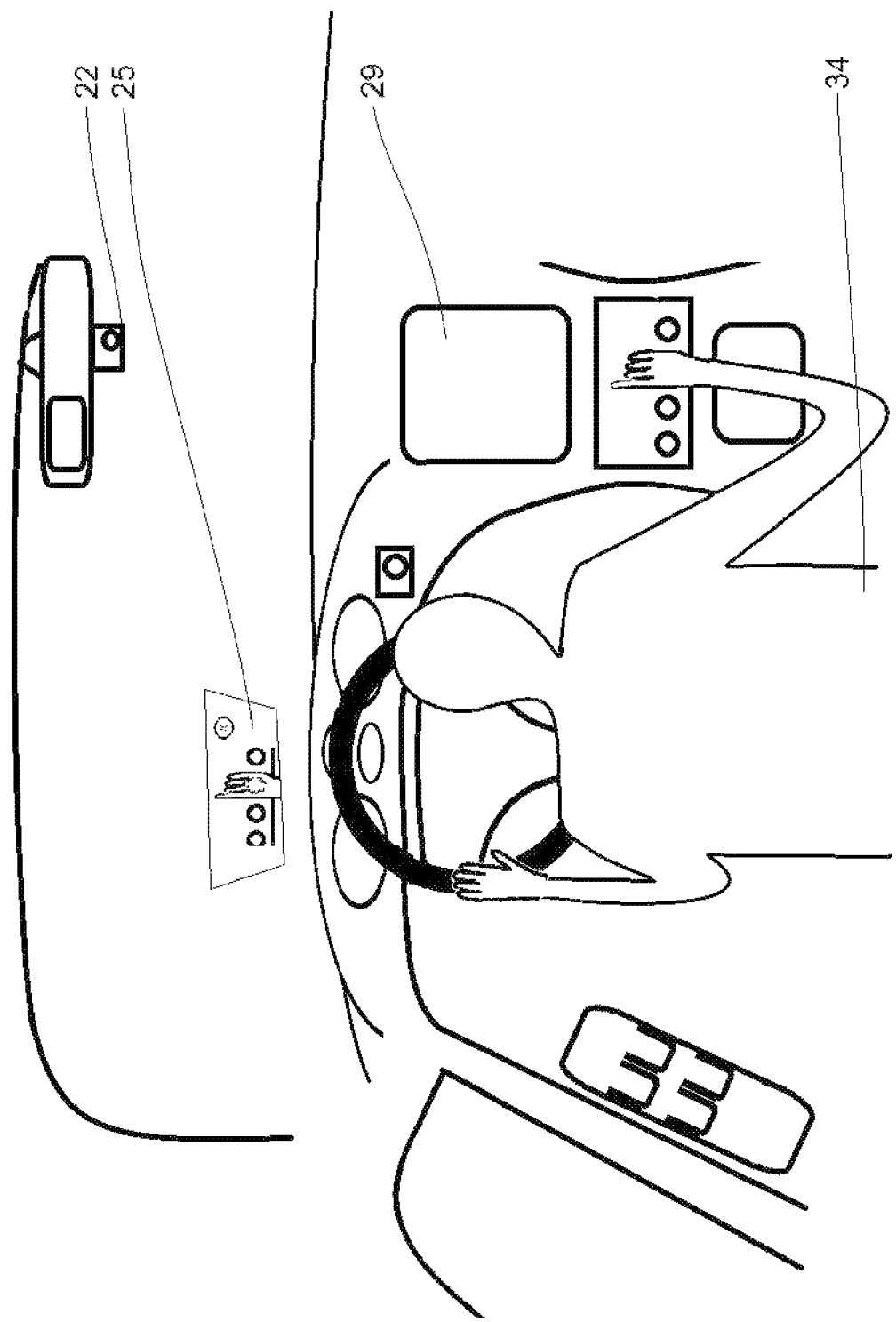
FIG. 7 shows a vehicle interior cabin similar to FIGS. 2 and 3, with a driver at the driver seat controlling control knobs at the central cluster and having his hand visible naturally at the HUD image but semi-transparent so that also the knob underneath the hand is visible.

The present invention utilizes an interior monitoring camera, or near infrared camera or similar detecting device, in the area of the central cluster (optionally at a roof area and looking downward toward the instrument panel and user inputs located thereat) for capturing the driver's hand and input devices such as the radio volume knob. The camera's live images may be presented as part of the (real time) image content 25 of a head up display device 24 (HUD), or of a display screen disposed at an area that is readily viewable by the driver when driving the vehicle so that the driver does not have to take his or her eyes off the road while driving and viewing the display screen. By that, the driver will be able to direct his or her hand toward the input interfaces properly without looking at the input device (typically located toward the center of the vehicle and not in the driver's direct field of view when looking forward through the windshield) but instead based on viewing the augmentation in front of him or her. Optionally, another part of the HUD image content may be conventional content (such as showing the current speed limit as a sign symbol such as shown in FIGS. 3, 4 and 7).

The driver's hand 35 may be shown as a real image directly captured by the camera, whereby the driver can readily view the displayed real images as the driver's hand approaches the accessory or controls, especially in case where the control button, knob or lever is a physical one, not a soft-button or touch sensor. In this case, the real accessories or controls may be shown as real images as well. Optionally, the accessories or controls may be shown in a stylized way, and the buttons may be augmented or stylized as being under the approaching hand or finger, preferably in the spatial orientation that the real hand or fingers are against the real accessories, controls or soft button position. For example, the HUD may display the driver's pointing finger together with the copy or avatar of a touch screen showing alphanumeric soft buttons of a navigation system input interface for entering city and street names intuitively, and by that stress free, since the finger movements will be directly reflected within the HUD image in front of the driver.

Figure 2:
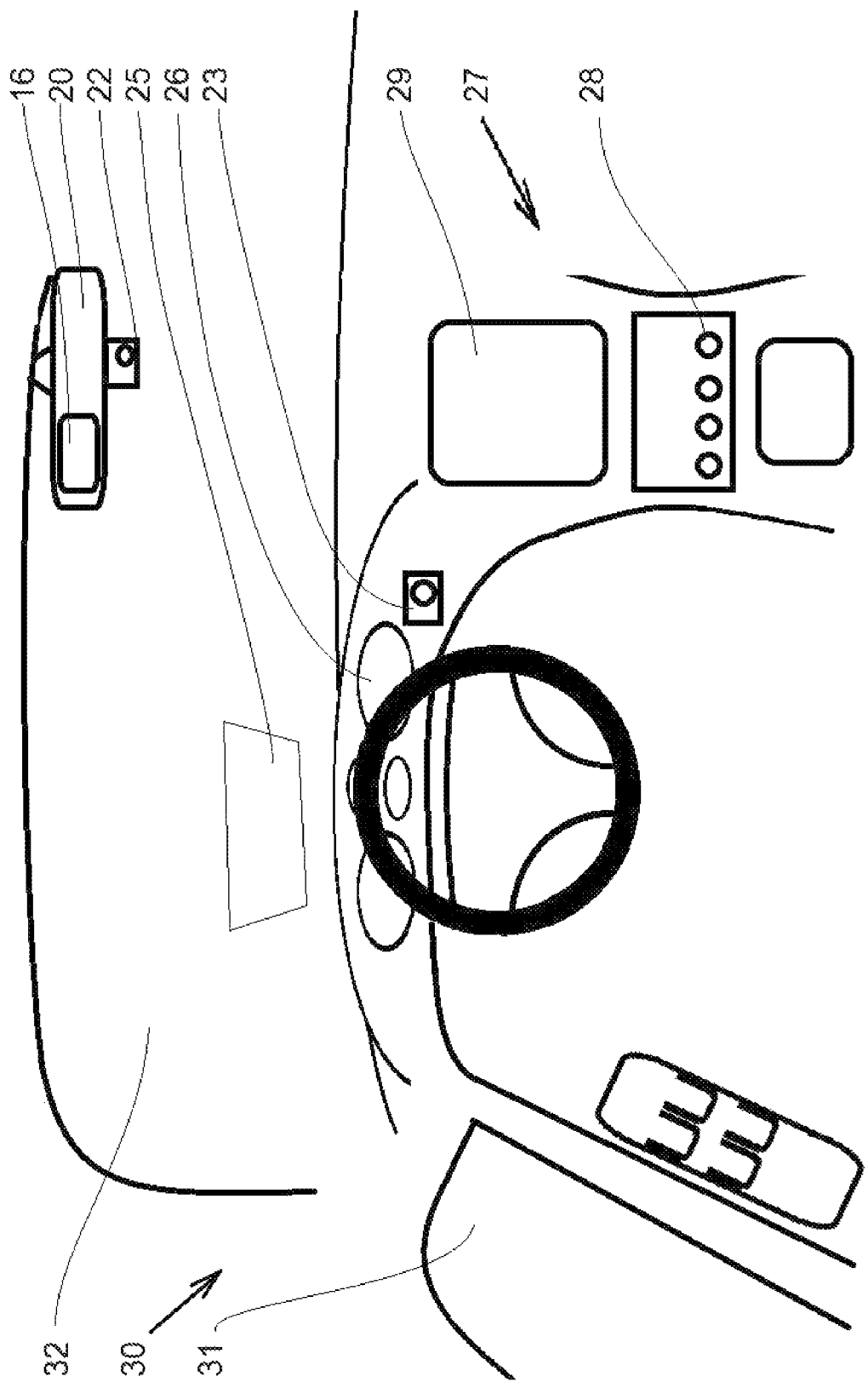
FIG. 2 shows a vehicle interior cabin with touch screen, knobs at the central cluster, a camera attached at the inner center rearview mirror, a camera integrated into the instrument cluster, and a HUD vision image 25 projected onto the windshield.
Figure 3:
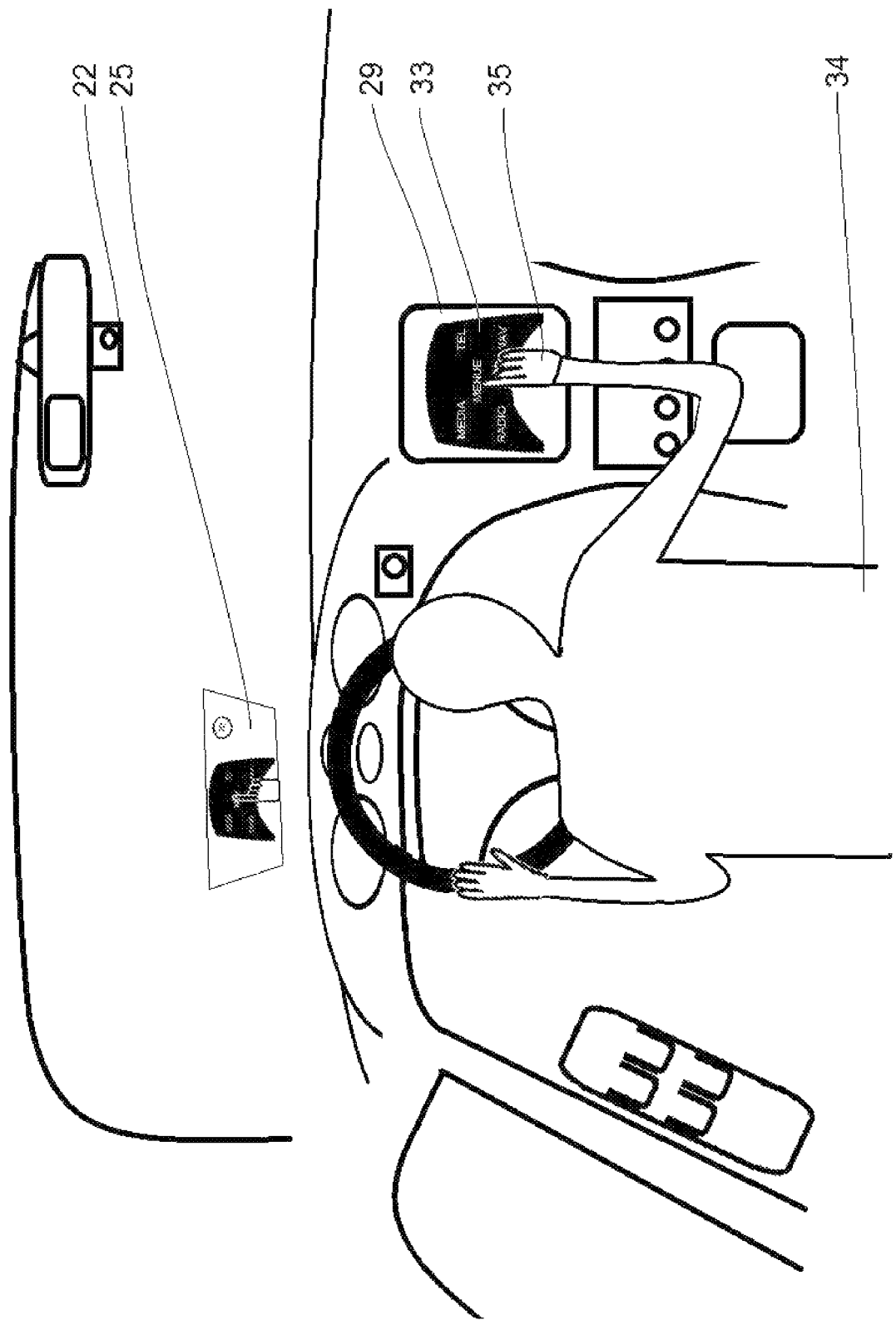
FIG. 3 shows a vehicle interior cabin similar to FIG. 2, with a driver at the driver seat using the touch screen at the central cluster and having his hand visible at the HUD image in an augmented way.
Figure 4:
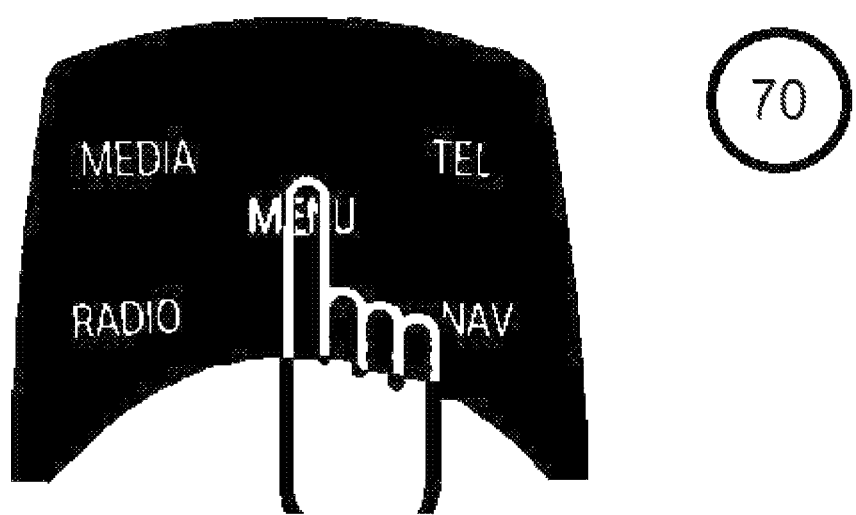
FIG. 4 shows the HUD image of FIG. 3, showing a hand stylized over a stylized menu in accordance with the present invention.
Figure 5:
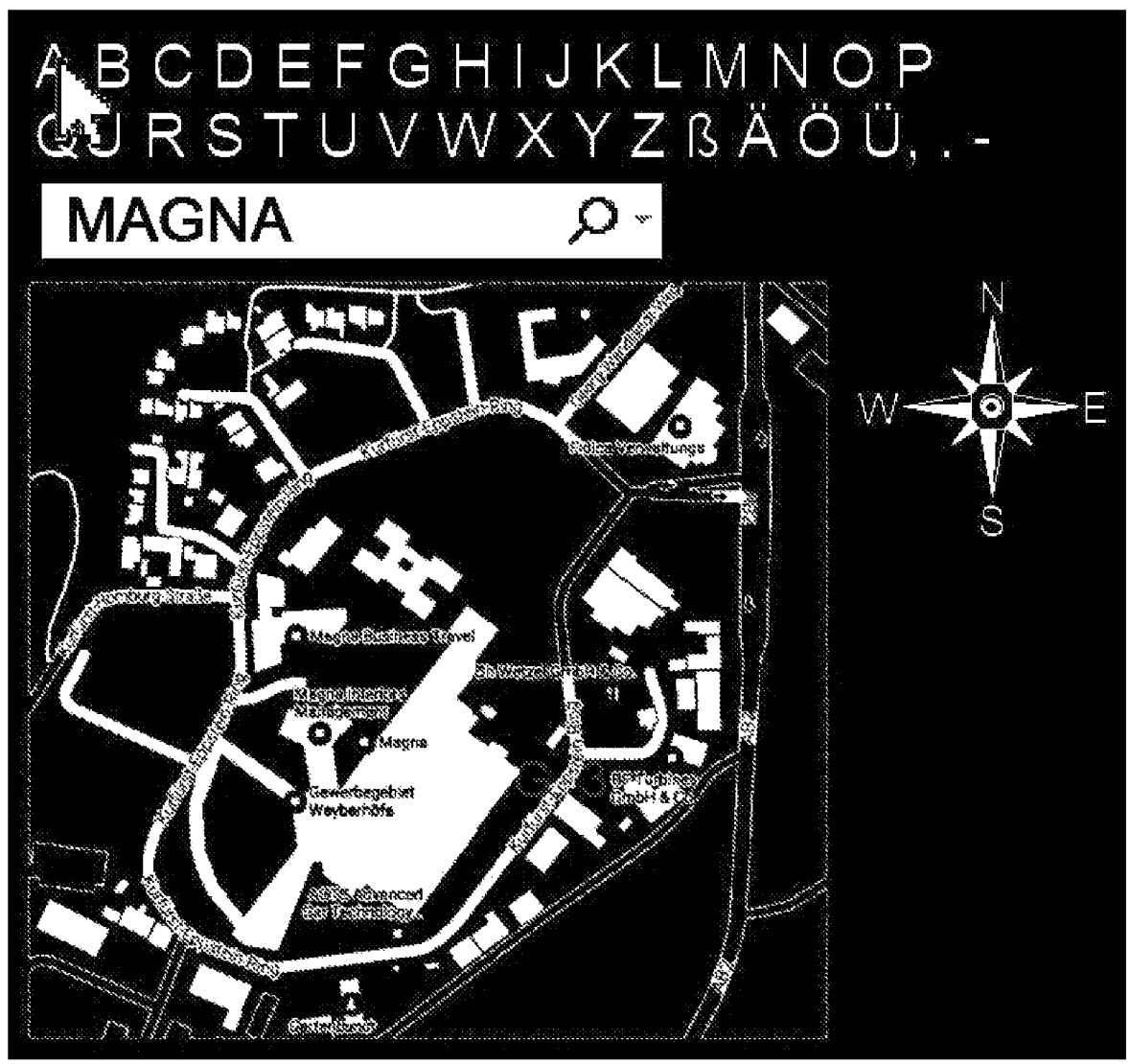
FIG. 5 shows a HUD vision image in accordance with the present invention, which may be generated as a visible image to the driver as shown in FIGS. 2, 3 and 7, showing the driver's pointing finger as an arrow hovering over the letters he or she is selecting.
Figure 6:
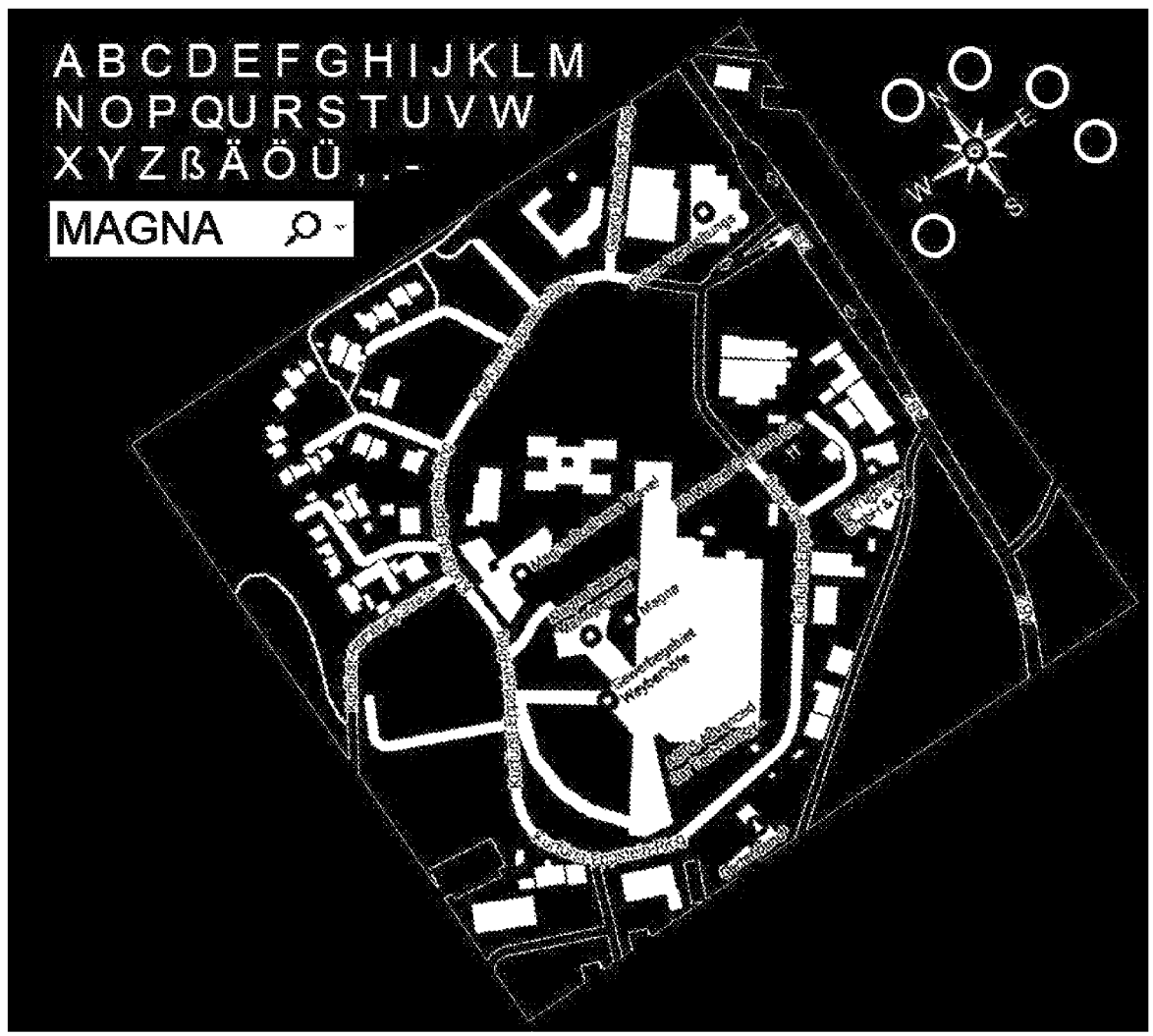
FIG. 6 shows a HUD vision similar to FIG. 5, where the driver's finger tips that she or he is putting on a touch screen are shown augmented as circles in the HUD view.

Optionally, the driver's hand may be shown in a stylized way, such as an avatar with the outlines of the hand (such as shown in FIGS. 2 and 3) or the finger tips may be shown as circles as shown in FIG. 6 (or other iconistic representations of portions of the hand or finger tips), optionally in a contrasting color and/or in adapted brightness towards the background so that the driver can readily view and conceive the displayed images or outlines in all outside lighting conditions. In the example of FIG. 6, the driver is rotating a navigation system's map, so that the northeast direction is currently at the top of the displayed image. Optionally, a pointing finger may be augmentedly displayed in the HUD view 25 as an arrow (or other iconistic representations) when being at an display area at which different choices or selections are provided, such as for selecting (soft-) roll boxes, grabbing a (soft-) handle, or such as shown in FIG. 5 when clicking (alphanumeric or other) letters, types or characters.

Optionally, the system may show touch screen control functions for controlling a virtual camera view of a surround vision system with 3D-turning, scroll and zooming functions, soft button highlighting functions based on finger approximation, remote parking space [view] selection by touch screen, gesture control for easy menu navigation and a gesture input locking function for preventing unwilling gesture input, such as by utilizing aspects of the systems described in U.S. Publication Nos. US-2015-0022664, which is hereby incorporated herein by reference in its entirety. Optionally, the system may show surround view vision system views at the HUD vision image 25.

Optionally, the driver's hand may be displayed or augmented partially or half transparent, especially when covering essential display content underneath such as the label of a button. This may also be done when displaying real knobs or buttons covered by an image (or avatar) of the driver's hand such as shown in FIG. 7 or an augmented image of an arrow or hand such as shown in FIG. 4. The image information of the buttons or knobs hidden by the hand may come from a data storage, which may be part of the image processing system according the invention, as non-real time (and non-true) images for being blended or merged with the real time images of the hand, such as captured by camera 22 or 23 (or other camera in the vehicle).

In applications where the input device is a touch pad or touch screen, the touch pad or screen is able to sense the finger tips approaching and touching very precisely (by its sensor nature). The touch screen or touch pad sensing input may optionally be fused with the data of the camera or cameras or taken alone as a control output for the hand or finger augmentation. In case the input device is a touch screen, the screen content or parts of it or a similar content may by shown as well, together with the hand, the outline of the hand or the finger tips. A touch command may be stylized different than the fingers sliding over the screen surface, a finger just resting on the surface or being elevated from the surface. For generating stylized hand or finger tips, there may be a suitable image processing algorithm utilized similar to those known from hand gesture capturing.

The camera and the display device or HUD may be activated to capture image data and to display images responsive to the driver's hand approaching or touching an accessory control, whereby, upon the driver's first touch at the user input or accessory control, the system is activated to display images to assist the driver in further controlling or adjusting the accessory. Optionally, the camera may capture image data and an image processor may process the captured image to determine when the driver moves his or her hand towards an accessory control, whereby the system may automatically operate to display the images at the display device for viewing by the driver while the driver is normally operating the vehicle. The system may activate the display device responsive to the driver's hand approaching selected accessories, such as HVAC controls, radio controls, navigation system controls, a touch screen, and/or any other accessories (or controls for accessories) typically disposed at or near the instrument panel or console or mirror assembly of the equipped vehicle.

Although the system according the invention includes aspects of gesture control, the present system has the advantage that no specific gesture set has to be trained to be interpreted as a command that the actual driver has to know to operate the controls. No mix in gesture control with physical (direct) controls (such as turning a physically present control knobs) takes place, and by that an unfamiliar user is able to control all desired functions as well as familiar functions, whereby the user can then adjust controls faster and is less distracted due to having the visual aid.

The HUD vision and system of the invention may have a haptic feedback within its input devices, accessories or controls, such as by utilizing aspects of the systems described in U.S. Publication Nos. US-2015-0022664 and US-2015-0277735, which are hereby incorporated herein by reference in their entireties. The haptic feedback may feedback each user entry. When hovering with an arrow or finger pointer over view items there may be a haptic feedback, possibly according the vision's relief. The feedback may simulate a grid snapping when turning, scrolling or scaling a view. The system may feedback each scrolling step, when scrolling through a menu or tool box. Optionally, the HUD image displayed may change color or otherwise highlight a touched or actuated input to visually indicate that the user has successfully actuated a selected input. The vision may utilize the letter rearrangement responsive to the user's finger widths, such as also shown in U.S. Publication No. US-2015-0277735.

Head and face direction and position tracking systems and/or eye tracking systems and/or gesture recognition systems may find use (or additional use) in supporting or adding to other systems. Such head and face direction and/or position tracking systems and/or eye tracking systems and/or gesture recognition systems may utilize aspects of the systems described in U.S. Pat. No. 7,914,187 and/or U.S. Publication Nos. US-2016-0137126; US-2015-0352953; US-2015-0296135; US-2015-0294169; US-2015-0232030; US-2015-0022664; US-2015-0015710; US-2015-0009010 and/or US-2014-0336878, which are hereby incorporated herein by reference in their entireties.

The head up display device or system may utilize aspects of the display systems described in U.S. Pat. Nos. 9,620,042; 9,405,120; 8,953,247; 8,427,751 and/or 7,253,723, and/or U.S. patent application Ser. No. 15/484,293, filed Apr. 11, 2017, now U.S. Pat. No. 10,401,621, Ser. No. 15/432,950, filed Feb. 15, 2017 and published Aug. 17, 2017 as U.S. Publication No. US-2017-0235137, and/or Ser. No. 15/364, 354, filed Nov. 30, 2016, now U.S. Pat. No. 10,324,297, and/or U.S. provisional application Ser. No. 62/348,459, filed Jun. 10, 2016, which are hereby incorporated herein by reference in their entireties.

Optionally, the display of the vision system may utilize aspects of the video display systems described in U.S. Pat. Nos. 5,530,240; 6,329,925; 7,855,755; 7,626,749; 7,581, 859; 7,446,650; 7,338,177; 7,274,501; 7,255,451; 7,195, 381; 7,184,190; 5,668,663; 5,724,187; 6,690,268; 7,370, 983; 7,329,013; 7,308,341; 7,289,037; 7,249,860; 7,004, 593; 4,546,551; 5,699,044; 4,953,305; 5,576,687; 5,632, 092; 5,677,851; 5,708,410; 5,737,226; 5,802,727; 5,878, 370; 6,087,953; 6,173,508; 6,222,460; 6,513,252 and/or 6,642,851, and/or U.S. Publication Nos. US-2012-0162427; US-2006-0050018 and/or US-2006-0061008, and/or International Publication Nos. WO 2010/099416; WO 2011/ 028686; WO 2012/075250; WO 2013/019795; WO 2012/ 075250; WO 2012/145822; WO 2013/081985; WO 2013/ 086249 and/or WO 2013/109869, and/or U.S. Publication No. US-2012-0162427, which are hereby incorporated herein by reference in their entireties.

The system includes an image processor operable to process image data captured by the camera or cameras, such as for detecting objects or the user's hand or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964;

6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular display system comprising:
  a camera disposed in an interior cabin of a vehicle equipped with the vehicular display system, the camera having a field of view that views a hand of a driver of the vehicle when the driver is normally operating the vehicle;
  an image processor operable to process image data captured by the camera;
  a heads up display system disposed in the vehicle, wherein the heads up display system establishes a heads up display viewable by the driver when the driver is looking at a windshield of vehicle, wherein the heads up display is derived at least in part from image data captured by the camera;
  wherein, responsive to processing by the image processor of image data captured by the camera, the heads up display comprises information representative of user actuatable inputs for controlling at least one accessory of the vehicle;
  wherein, responsive to processing by the image processor of image data captured by the camera, the heads up display comprises images representative of at least a part of the driver's hand;
  wherein the camera views the driver's hand at a touch screen of the vehicle, and wherein the heads up display comprises images representative of the touch screen;
  wherein the at least one accessory is selected from the group consisting of (i) an HVAC system of the vehicle, (ii) a radio of the vehicle, (iii) a navigation system of the vehicle and (iv) the touch screen of the vehicle;
  wherein the images representative of at least the part of the driver's hand are derived at least in part from image data captured by the camera;
  wherein the information representative of the user actuatable inputs comprises stored images of the user actuatable inputs, and wherein the heads up display stored images of the user actuatable inputs are merged with the images representative of at least the part of the driver's hand, and wherein the images representative of at least the part of the driver's hand are superimposed over the stored images of the user actuatable inputs; and
  wherein the images representative of at least the part of the driver's hand are partially transparent so the information representative of the user actuatable inputs are viewable through the images representative of at least the part of the driver's hand.

2. The vehicular display system of claim 1, wherein the heads up display comprises video images of at least the part of the driver's hand as captured by the camera.

3. The vehicular display system of claim 1, wherein the heads up display comprises an avatar representative of at least the part of the driver's hand.

4. The vehicular display system of claim 3, wherein the information representative of the user actuatable inputs are merged with the avatar representative of at least the part of the driver's hand.

5. A vehicular display system comprising:
  a camera disposed in an interior cabin of a vehicle equipped with the vehicular display system, the camera having a field of view that views a hand of a driver of the vehicle when the driver is normally operating the vehicle;
  a heads up display system disposed in the vehicle, wherein the heads up display system establishes a heads up display viewable by the driver when the driver is looking at a windshield of vehicle, wherein the heads up display is derived at least in part from image data captured by the camera;
  wherein the heads up display comprises (i) information representative of user actuatable inputs for controlling at least one accessory of the vehicle and (ii) images representative of at least a part of the driver's hand;
  wherein the camera views the driver's hand at a touch screen of the vehicle, and wherein the heads up display comprises images representative of the touch screen;
  wherein the at least one accessory is selected from the group consisting of (i) an HVAC system of the vehicle, (ii) a radio of the vehicle, (iii) a navigation system of the vehicle and (iv) the touch screen of the vehicle;
  wherein the images representative of at least the part of the driver's hand are derived at least in part from image data captured by the camera;
  an image processor operable to process image data captured by the camera, and wherein the heads up display comprises images representative of at least the part of the driver's hand responsive to processing by the image processor of image data captured by the camera;
  wherein the information representative of the user actuatable inputs is merged with images representative of at least the part of the driver's hand;
  wherein the heads up display comprises information representative of the user actuatable inputs responsive to processing by the image processor of image data captured by the camera;
  wherein the information representative of the user actuatable inputs comprises stored images of the user actuatable inputs, and wherein the heads up display stored images of the user actuatable inputs are merged with the images representative of at least the part of the driver's hand, and wherein the images representative of at least the part of the driver's hand are superimposed over the stored images of the user actuatable inputs; and wherein the images representative of at least the part of the driver's hand are partially transparent so the information representative of the user actuatable inputs are viewable through the images representative of at least the part of the driver's hand.

6. The vehicular display system of claim 5, wherein the heads up display comprises video images of at least the part of the driver's hand as captured by the camera.

7. The vehicular display system of claim 5, wherein the heads up display comprises an avatar representative of at least the part of the driver's hand.

8. A vehicular display system comprising:
  a camera disposed in an interior cabin of a vehicle equipped with the vehicular display system, the camera having a field of view that views a hand of a driver of the vehicle when the driver is normally operating the vehicle;
  a heads up display system disposed in the vehicle, wherein the heads up display system establishes a heads up display viewable by the driver when the driver is looking at a windshield of vehicle, wherein the heads up display is derived at least in part from image data captured by the camera;
  wherein the heads up display comprises (i) information representative of user actuatable inputs for controlling at least one accessory of the vehicle and (ii) images representative of at least a part of the driver's hand;
  wherein the at least one accessory is selected from the group consisting of (i) an HVAC system of the vehicle, (ii) a radio of the vehicle, and (iii) a navigation system of the vehicle;
  wherein the camera views the driver's hand at a touch screen of the vehicle, and wherein the heads up display comprises images representative of the touch screen;
  wherein the images representative of at least the part of the driver's hand are derived at least in part from image data captured by the camera;
  an image processor operable to process image data captured by the camera, and wherein the heads up display comprises images representative of at least the part of the driver's hand responsive to processing by the image processor of image data captured by the camera;
  wherein the heads up display comprises information representative of the user actuatable inputs responsive to processing by the image processor of image data captured by the camera;
  wherein the information representative of the user actuatable inputs comprises stored images of the user actuatable inputs, and wherein the heads up display stored images of the user actuatable inputs are merged with the images representative of at least the part of the driver's hand, and wherein the images representative of at least the part of the driver's hand are superimposed over the stored images of the user actuatable inputs; and
  wherein the images representative of at least the part of the driver's hand are partially transparent so the information representative of the user actuatable inputs are viewable through the images representative of at least the part of the driver's hand.

9. The vehicular display system of claim 8, wherein the heads up display comprises video images of at least the part of the driver's hand as captured by the camera.

10. The vehicular display system of claim 8, wherein the heads up display comprises an avatar representative of at least the part of the driver's hand.

* * * * *